United States Patent [19]

Amrine et al.

[11] 4,001,771
[45] Jan. 4, 1977

[54] INTRUDER DETECTING SECURITY SYSTEM

[75] Inventors: Herman Eugene Amrine, San Jose; Richard Eugene Baker, Morgan Hill, both of Calif.

[73] Assignee: International Business Machines Corporation, Armonk, N.Y.

[22] Filed: Oct. 20, 1975

[21] Appl. No.: 624,153

[52] U.S. Cl. .................. 340/16 R; 340/258 D; 340/261
[51] Int. Cl.² .................................... G08B 13/00
[58] Field of Search ............. 340/258 D, 261, 16 R

[56] References Cited
UNITED STATES PATENTS

| | | | |
|---|---|---|---|
| 2,435,253 | 2/1948 | Turner | 340/6 |
| 2,535,255 | 12/1950 | Barnes et al. | 340/16 |
| 2,614,166 | 10/1952 | Piety | 340/15.5 |
| 2,982,942 | 5/1961 | White | 340/16 R |
| 3,109,165 | 10/1963 | Bagno | 340/258 |
| 3,258,762 | 6/1966 | Donner | 340/261 |
| 3,261,009 | 7/1966 | Stetten et al. | 340/261 |
| 3,383,690 | 5/1968 | Keller | 343/113 |
| 3,525,978 | 8/1970 | Heinecke et al. | 340/16 |
| 3,543,261 | 11/1970 | Burney | 340/261 |
| 3,585,581 | 6/1971 | Aune et al. | 340/16 |

*Primary Examiner*—Richard A. Farley
*Attorney, Agent, or Firm*—George E. Roush

[57] ABSTRACT

This electronic perimeter intruder detecting security system is arranged for measuring the differences of propagation times and/or velocities of a plurality of different seismic-like waves simultaneously set up by an intruder at a plurality of sensor stations and for calculating the location, velocity, and frequently for identifying the type of intruder. Provisions are disclosed for screening false alarms or waves emanating from without a guarded zone and for ignoring waves from sources not of interest in guarding that zone.

20 Claims, 10 Drawing Figures

INTRUDER DETECTING SECURITY SYSTEM

The invention relates to electronic security systems, and it particularly pertains to such systems for detecting the presence, the velocity and the type of an intruder by analyzing seismic-like waves set up by that intruder.

The prior art perimeter intruder detection systems fall into several classifications. One is an audible system detecting sound or noise made by an intruder. Another is a visual system usually involving videcon and like cameras. The class to which the invention relates is termed a seismic wave detection system. The prior art seismic or seismic-like wave detection systems usually utilize geophones as seismic wave sensors, but are susceptible to false alarms and are insensitive to the velocity of the intruder and the direction in which the intruder moves.

Examples of the prior art arrangements pertinent to the electronic circuitry of the invention are to be found in the following U.S. Patents:

| | | | |
|---|---|---|---|
| 2,435,253 | 2/1948 | Turner | 340/6 |
| 2,535,255 | 12/1950 | Barnes et al | 340/16 |
| 2,614,166 | 10/1952 | Piety | 340/15.5 |
| 3,109,165 | 10/1963 | Bagno | 340/258 |
| 3,258,762 | 6/1966 | Donner | 340/261 |
| 3,261,009 | 7/1966 | Stetten et al | 340/261 |
| 3,383,690 | 5/1968 | Keller | 343/113 |
| 3,525,978 | 8/1970 | Heinecke et al | 340/16 |
| 3,543,261 | 11/1970 | Burney | 340/261 |
| 3,585,581 | 6/1971 | Aune et al | 340/16 |

The U.S. patents to Turner, to Piety and to Keller are directed to audio frequency, seismic wave and radio frequency wave sensing with two sensors arranged orthogonally at a given location for range or bearing determination. These arrangements as disclosed are basic to range and bearing determination by analyzing different fronts of the same wave, while the system according to the invention is arranged to sense different waves from a single disturbance as will be seen from the description of the apparatus.

The U.S. patents to Barnes and Burger, to Burney and to Aune, Jacobs and Spence are directed to systems having two sensors or transducers for determining the first sensing of different fronts of the same wave. The Barney et al disclosure also determines the range by means of an electronic timing circuit forming part of the first arrival detecting circuit. The disclosure of Burney et al is an alarm system which is based on sensing different frequency components of the same wave for selectively responding to or ignoring specific information carried by the wave. Thresholding is incorporated for discriminating on the basis of wave amplitude also. The Aune et al disclosure likewise is directed to an alarm system discriminating on the basis of frequency by using sensors or geophones of distinctly different frequency range. Again these arrangements as disclosed are basic to intruder systems by analyzing different frequency components of a single wave while the system according to the invention is arranged to sense differences in two or more waves from a single disturbance.

The U.S. patents to Bagno, to Donner and to Heinecke and Grobis are directed to arrays of geophones for detecting the presence and/or range of an intruder by analyzing one seismic wave from a disturbance of the earth. The disclosure of Bagno relates to parallel connected sensors of rather large bandwidth and a variable bandwidth filter for selecting targets as deemed advisable. The teaching of Donner is centered about apparatus with a variable threshold feature for selecting on the basis of the rise time of a single wave resulting from a disturbance. The arrangement disclosed by Heinecke et al provides for digitizing the data for delivery to a data processor. It also is dependent on geophones spaced a half-wavelength apart at the highest frequency of wave to be analyzed although some leeway in this regard is suggested. The circuitry for processing the data for resolution must be conventional as it is not disclosed.

The U.S. patent to Stetten and Wallen is directed to an alarm system comprising but a single geophone and a band-pass filter circuit for detecting a walking or running human or animal intruder.

Again it is pointed out that all of these prior art arrangements are based on the sensing of different aspects of a single wave emanating from a single disturbance or the like, while the arrangement according to the invention is based on the analysis of different waves from a single disturbance as is set forth in the description of the apparatus.

The objects indirectly referred to hereinbefore and those that will appear as the specification progresses are attained in a system for sensing a plurality of differently propagated seismic waves set up by an intruder, analyzing the waves for differences in velocity, magnitude, duration and direction of propagation and resolving the analysis into false or true alarms and, if the latter, for determining location of, predicted entry by the type of intruder.

The term seismic wave as employed herein is construed to include not only earthquake and/or explosive charge induced waves in the earth and/or like elastic media from which the term is terminology-of-the-art, but also to include other waves and media to which principles of seismic wave intelligence are applicable. Examples of such extra-definitive waves and media include the waves effected in the earth, including the relatively large bodies of water thereon and earth-like media by personnel, machines, animals and meteorological disturbances. More particularly, the apparatus according to the invention is directed to the sensing of seismic waves in the earth, water, paving, piping, flooring and other components of man-made structures for indications of the presence of thunderstorms, wind, rain, hail, snow and such meteorological phenomena in the background and the presence of the lower animals of all kinds normally encountered in the general location to be protected, man and human directed vehicles in the foreground that will cause waves to move through the subject media that can be analyzed as though seismic waves of greatly reduced intensity.

A security system is readily based on the analysis of seismic waves. A perimeter is chosen about a location, for example, a building and surrounding ground to be guarded. This perimeter may be a theoretical line on one side of which all intrusions are investigated and on the other side of which only the path of an intruder passing through the perimeter line is noticed. More frequently, a zone between two "concentric" perimeter lines is established and all waves emanating outside the zone are ignored except for paths within the zone passing into the interior of the perimeter.

A plurality of pairs of sensors, geophones, for example, are placed around the perimeter of the area to be guarded. One geophone of each pair is arranged horizontally with respect to the earth or other material through which the seismic waves will propagate and more or less axially of a central location within the perimeter. The other geophone of each pair is arranged in the same plane but orthogonally to the one geophone and therefore tangentially of the perimeter or zone line. Electric leads from the geophones are terminated at the central location in electronic apparatus utilizing the electric currents generated by the geophones when activated by an intruder. A single pair of geophones is arranged for bearing, range and velocity according to one embodiment of the invention. Two or more of geophones are connected to the apparatus for location and velocity determination by triangulation analyses according to another embodiment of the invention.

Seismic and the seismic-like waves with which the invention is concerned are transmitted through the earth and like madia in longitudinal pressure waves (P-waves) parallel to the direction of propagation and transverse shear waves (S-waves) perpendicular to the direction of propagation. The electronic circuitry according to the invention utilizes the fact that P-waves and S-waves propagate at different velocities to improve geophone type intrusion detection systems greatly. In the earth, the velocity of P-waves is on the order of 6 Km/sec (20K ft/sec) and the velocity of S-waves is on the order of 3.3 Km/sec (11K ft/sec). The circuitry according to the invention also utilizes the polarization property to eliminate false alarms caused by Rayleigh surface waves and by disturbances, such as vehicular traffic, originating outside of the zone to the guarded.

The circuitry according to the invention is arranged to determine the range of or distance to the point of intrusion by analyzing the difference in arrival times of the P- and S-waves. The direction or azimuth is determined by a single geophone pair bearing analyzer or by triangulation from the outputs from two pairs of sensors or geophones. The velocity of travel of the intruder is calculated from two or more, preferably more, location determinations and the time elapsing between determinations. Some indication of the type of intruder may be had empirically by comparing a pattern with a predetermined pattern resulting from a series of observations of a known "intruder". Similar determinations made in successive readings in a short time will afford an indication of general classification, such as a vehicle, a pedestrian, large animal, horse being ridden or driven, a cow or horse meandering and the like.

Each geophone pair is connected by a cable to a like pair of amplifier and detector circuits at the central location. A range analyzer circuit is connected to the two detector circuits of a pair selected because of an indication of activity for determining the distance of the impact from the sensors. In one embodiment according to the invention, the bearing analyzer circuitry is connected to the same two detector circuits for determining the direction of the impact with respect to the sensors. In another embodiment of the invention, direction is determined by data from two or more range determinations by triangulation. In either case, data from the range analyzer and from the bearing analyzer, if used, are applied to a multiplexer circuit and thereafter applied in time division multiplex fashion to a data processing system where the data are resolved. Alternately, multiplexing may be accomplished between the detector circuits and the analyzer circuits.

The amplifier and detector circuits comprise a preamplifier circuit followed by a bandpass amplifier circuit having a center frequency matching the period or natural frequency of the geophone and a band width on the order of 20 percent of the center frequency. A comparator circuit and a rectifier circuit or detector follow the bandpass amplifier and a portion of the detector output is applied as an automatic gain controlling voltage to a shunt impedance type gain modifying device.

Range analyzing circuitry according to the invention comprises exclusive OR logical gating circuitry coupled to the output circuits of the pair of seismic wave detector circuits and counting circuitry arranged to measure the duration of the seismic waves and the difference between the arrival times of the two waves. Auxiliary logical circuitry is provided for accommodating variations and for applying the data determined to utilization circuitry.

Bearing analyzing circuitry according to the invention for determining direction from a single pair of geophones comprises a conventional arithmetic dividing circuit to which digital data representing the distances in terms of the elapsed times are applied for determining the tangent of the angle to be determined. The output of the dividing circuit is translated by the data processing circuitry, preferably in a table look-up arrangement, into the bearing.

In order that the practical advantages of the invention obtain, a preferred embodiment thereof, given by way of example only, is described in detail hereinafter with reference to the accompanying drawing, forming a part of the specification, and in which.

Figure 1:
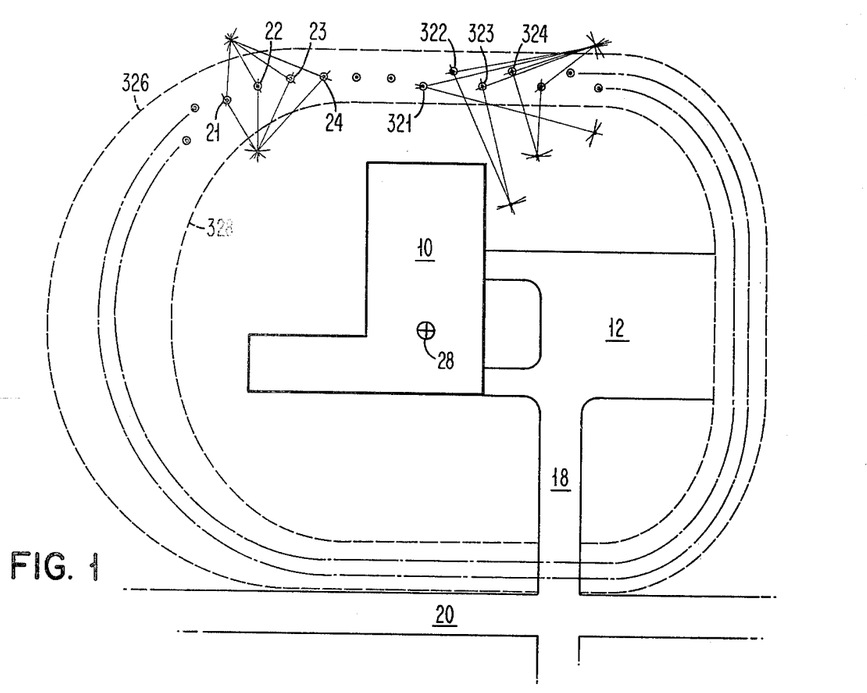
FIG. 1 is a plan view of a perimeter intruder detection system installation employing circuitry according to the invention.

A plan view of a typical installation of a perimeter intruder detection system is shown in FIG. 1. A building 10 is to be protected from intruders. A parking lot 12, a driveway 18 and a street 20 are subject to relatively heavy legitimate traffic as well as being areas from which an intruder might enter. In addition, some protection is desirable for the parking lot 12 to prevent possible theft and/or vandalism. In the perimeter intruder detection system according to the invention, a number of sensors 21, 22, 23, 24 and so on are buried in the earth at suitable intervals in a pattern surrounding the building 10. Preferably the sensors are geophones for sensing seismic waves in the earth. Electric connections from the sensors are carried underground to the building 10 wherein the major part of the electronic apparatus is located, for example, at a convenient location indicated by Plan Position Indicator (PPI) Cathode Ray Tube (CRT) display 28. Preferably, a computer system is utilized on a time-shared basis only, for making rapid and precise computations necessary for the efficient operation of the system according to the invention. A sensor especially adaptable for this purpose is the geophone.

Figure 2:
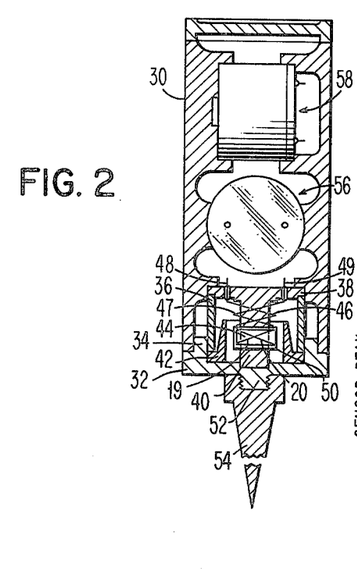
FIG. 2 is a cross-section of an example of a geophone device of a type which may be used with the detection system according to the invention.

A simplified cross-sectional illustration of a typical geophone suitable for use in the circuit arrangement of the invention is shown in FIG. 2. Mechanically, the geophone is a spring-loaded inertial mass; electrically it is a generator. A tubular casing 30 has a baseplate 32 which carries a annular flange 34. A magnet 36 formed by a tubular length of permanent magnet material rests in the flange 34. An end plate 38 on the upper end of the magnet 36 has a downwardly extending core portion 40 which acts as a magnetic pole-piece. The baseplate 32 is of non-magnetic material and it is recessed to receive the lower end of the pole-piece 40. At the lower end of the magnet 36 there is an inner pole-piece 42 which seats within the flange 34 of the bottom plate 32 and extends upwardly as a hollow frusto-conical shape terminating within the hollow annular space within the tubular magnet 36 and outside the pole-piece 40. There is accordingly a very strong magnetic flux radially across or through such annular space between the inner surface of the pole-piece 42 and the outer surface of the pole-piece 40. Within this annular space there is a movable spool 44 of para-magnetic material supported by two spiral springs 46 and 47 from terminal posts 48 and 49, these being sealed in insulation and extended through the end plate 38. A solenoid 50 is wound on the magnetic mass spool 44 which is freely movable around the pole-piece 40. The electric leads to the coil 50 are constituted by the spiral springs 19 and 20. The spool-shaped magnetic mass 44 with the coil on it, is freely suspended for vertical movement in the annular space between the pole pieces, and in some sensors can also move sideways within limits. Whenever the sensor is agitated due to waves in the earth, the sensor body as a whole moves, but the magnetic spool 44 with the coil 50 on it tends to remain stationary due to its inertia, and consequently a slight voltage signal will be generated in the coil 50 and made available at terminals 48 and 49. The bottom plate 32 is provided with a threaded connection 52 and a downwardly extending spike 54 is screwed thereon, or alternately molded thereon, if the unit is to be located above the earth by pushing the spike into the earth. This provides a signal usable in response to low intensity Rayleigh waves produced by the footsteps and body movements of human beings and animals. Preferably, the entire instrument is buried firmly in the earth and therefore moves with any motion of the earth. The inertial mass of coil 44 tends to resist any movement and therefore motion of the earth induces relative motion between the case 30 and the core 44. Thus, relative motion between the case 30 and the core 34 induces a voltage in the core winding substantially proportional to the velocity of movement.

Three separate but substantially identical instruments preferably are combined in the one core structure as shown. The instrument with the vertical core 44 as described hereinbefore is used to detect surface waves and is not used in the system according to the invention although it is useful therewith in some correlating observations. The two instruments 56 and 58 with the cores lying in the same direction parallel to the surface of the earth and othogonally to each other are connected in the circuitry to be described hereinafter.

Geophones, by design, are highly susceptible to any kind of ground or earth motion; however, intrusion detection systems are desired to respond only to impact type motion caused by such things as a footstep and not respond to motion caused by wind, rain and other weather conditions. A large volume of unwanted data is eliminated by choosing the optimum natural frequency for the geophones to be used. Virtually all off-the-shelf geophones have natural frequencies in the range from 1 to 30 Hz and most conventional commercial detection systems use these. Low frequency geophones are extremely difficult to use because of the large ambient noise level below 50 Hz. Wind causes vibrations in the range from 1 to 10 Hz and Rayleigh surface waves from many sources are present in the range from 10 to 50 Hz, rain is a major noise generator and makes high frequency geophones undesirable. Geophone response to a sinusoidal input is essentially flat from the natural frequency upward but is highly attenuated at frequencies below the natural frequency. For the system according to the invention, geophones with a natural frequency on the order of 100 Hz were chosen. The geophone output is passed through a filter to attenuate signals above 110 Hz and below 90 Hz. This gives a response band 20 Hz wide centered about 100 Hz which is in the area of least ambient noise. Additional measures taken to minimize the occurrence of false alarms and the like are described hereinafter.

Seismic waves are transmitted through the earth in longitudinal waves, parallel to the direction of propagation, and transverse waves, perpendicular to the direction of propagation. The longitudinal waves, in which the particle motion is parallel to the direction of propagation, are termed P-waves (primary); the transverse waves, in which the particle motion is perpendicular to the direction of propagation, are called S-waves (secondary). The P-waves and S-waves propagate at different velocities, with the primary waves traveling faster than the secondary waves. The differential time increases in proportion to the increase in distance from the sensor and the density of the medium. Measurements made in the test environment ranged from 1.9 M/ms (6.3 ft/ms) in dry, hard adobe soil to 0.6 M/ms (2 ft/ms) in loose, saturated adobe soil. On the surface of a semi-infinite solid, such as the earth, the third type of wave hereinbefore mentioned, the Rayleigh surface wave, hereinafter termed the R-wave, is also propagated. Geophones buried just beneath the surface of the earth are subject to all three types of these waves.

Through an isotropic unbounded elastic solid of which the earth is a fair approximation, two particular types of elastic waves are propagated. Particle motion in these two types of waves is parallel to the direction of propagation and perpendicular to it, respectively. A wave in which the particle motion is parallel to the direction of propagation is termed a P-wave (primary).

A wave in which the particle motion is perpendicular to the direction of propagation is terms an S-wave (secondary).

The mutually perpendicular S- and P- and R-waves have different velocities of propagation as indicated by the equations below.

$$V_P = ([K + 4G/3]/p)^{1/2} \quad (1)$$

$$V_S = (G/p)^{1/2} \quad (2)$$

$$V_R = C(G/p)^{1/2} \quad (3)$$

Where K is the bulk modulus of the solid,
G is the shear modulus,
p is the density, and
C is a constant slightly less than unity (ranging from about 0.90 to about 0.99).

Roughly, the velocity of P-waves is on the order of 6Km/sec (20,000 ft/sec) and the velocity of S-waves is on the order of 4.6 Km/sec (14,000 ft/sec); therefore, the differential velocity is roughly 1.8 M/ms (6 ft/ms). These figures are based on earthquake data and represent an average of velocities through many different media. Since the propagation velocity is a function of the density of the medium, a radical difference in velocity can be expected, if for example, the terrain changes from loose sand to hard rock. Measured values for a test installation were from 0.6 to 2 M/ms (2 to 6.3 ft/ms). Wide variation of differential velocity does not constitute a serious problem for the detection system since each geophone pair operates independently of all of the others. The intruder distance measurements in different media require only the change of a multiplicative constant in the associated computer or data processor program.

Figure 3:
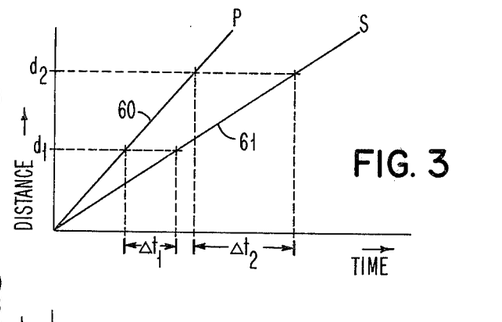
FIG. 3 is a graphical representation of the differential time periods to be expected from different intervals of impacts at differing distances from the sensor as encountered in a system according to the invention.

FIG. 3 is a graphical representation which shows the differential times to be expected from impacts occurring at different distances from the sensor. As can be seen, from curves 60 and 61, the differential time increases in proportion to the increase in distance of the impact from the sensor.

Figure 4:
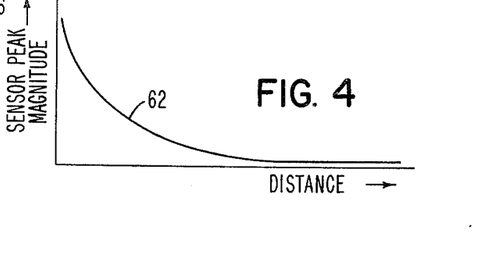
FIG. 4 is a graphical representation of a sensor peak output magnitude against distance as encountered in a system according to the invention.

Seismic waves generated by an impact will travel outward, spherically, from the point of impact. The energy content of the waves will be dissipated as a function of distance by geometrical spreading and by the attenuation characteristics of the medium. If there is a media interface, the energy content of the waves will be further dissipated since some portion of them will be reflected. In general, in the absence of an interface, the energy and therefore the magnitude of a sensor response, will decrease exponentially with distance, as is shown by a curve 62, in FIG. 4. For the sensors used in the test installation, peak signal magnitude ranged from approximately 100 mv for a footstep at 0 M to about 100 $\mu$V for a footstep at 6M (20 feet) from the sensor.

Differential P-S velocity is measured in a test or calibrating set-up. Measurements are made at various isolated geophone pairs and at various angles. The general procedure is to thump the ground lightly at a known distance and angle with a small piece of wood (a length of fir 2 inches × 4 inches is suitable) to create a seismic pulse and measure the difference in P- and S-wave arrival times at the geophone pair. Thumps are made preferably at increments of 1.5 meters (5 feet), from zero to 9 meters (30 feet) along a line perpendicular to the perimeter (90°). Data taken with a hard packed adobe environment and having practically zero water content indicated a differential velocity of 1.9 M/ms (6.29 ft/ms). Data taken with ground loosely packed and saturated, indicated a differential velocity of approximately 0.6 M/ms (2 ft/ms).

Measurements of resolution capability are taken at a convenient distance. Ideally, these measurements should all occur precisely in the same amount of time time. The best case in one test occurred at 4.6 meters (15 feet) (0.25 ms) and the worst at 1.5 M (5 feet) (1.25 ms). This implies that a single data point used to locate the distance of an intruder is subject to an error of 0.3 to 1.2 meters (1 to 4 feet).

Figure 5:
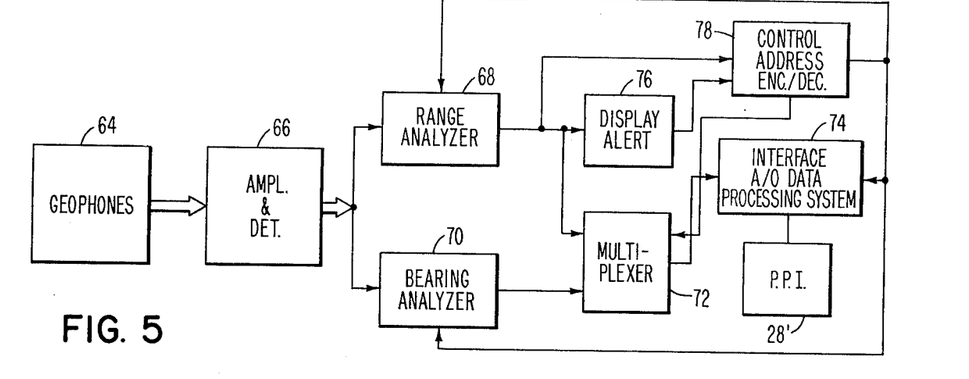
FIG. 5 is a functional diagram of electronic circuitry for a perimeter intruder detection system according to the invention.

A functional diagram of the perimeter intruder detection system according to the invention is shown in FIG. 5. A multiple of pairs of geophones 64 arrayed about the building to be protected are connected by a multiple of four-wire cables to preamplifying and detecting circuitry 66. After processing, the data from a geophone pair is applied to a range analyzer circuit 68 and the same data is applied to a bearing analyzer circuit 70. The data from the detector circuitry 66 may also be applied as desired to other analyzing circuits as the problem at hand dictates. For example, the data may be transmitted to computing circuitry programmed for triangulation arithmetic data translation, in which case the bearing analyzer circuit 70 is not needed. Those skilled in the art will use a computer for further analyzing the data. The output from the range analyzer circuit 68 and the bearing analyzer circuit 70 is applied to a multiplexer circuit 72. Preferably, a number of range and bearing analyzer circuits are used, although one pair of such circuits might be multiplexed to the detector circuit, in order that immediate data for a possible multitude of intruders is available for inspection by the security dispatcher. Data from the multiplexer is ultimately applied to a CRT display 28' which may be the plan position indicator type of display 28' which is particularly advantageous with a system according to the invention. Data from the multiplexer circuit 72 is applied to an interface and/or data processing system 74 which determines and produces the data for the PPI CRT display 28'. Data may also be translated for positioning remotely located searchlights and/or closed circuit televiewing scanning cameras and the like. A display alert circuit 76 and a control address encoding/decoding circuit 78 are coupled to the range analyzer circuit for generating address data for the latter and for the bearing analyzer 70 and the interface to the data processing system 74. Pertinent details of the circuits shown in the figure are set forth hereinafter.

Figure 6:
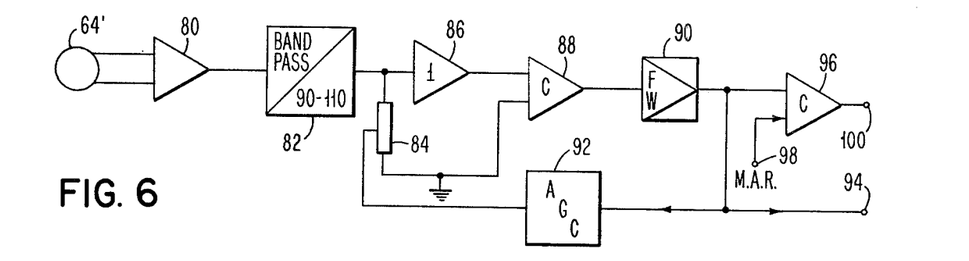
FIG. 6 is a logical diagram of one preamplifying and detecting circuit according to the invention.

One channel of the preamplifying and detecting circuit 66 is shown functionally in FIG. 6. A geophone 64' is connected by two conductors of an electric cable to a preamplifier circuit 80. The output of this amplifier is applied to a band pass filter circuit 82, which is preferably a 20 Hz wide filter centered at 100 Hz. An automatic gain control circuit impedance element 84 is connected between the band pass filter 82 and a unity gain amplifying circuit 86. The output of the latter is applied to a comparator circuit 88 which in turn is coupled to a full wave rectifying circuit 90. The output of the full wave rectifying circuit is used for automatic gain control and is applied to an automatic gain controlling circuit 92, the output of which is applied to the automatic gain controlling impedor circuit 84 for varying the shunt resistance to the alternating current coupling circuit between the band pass filter 82 and the unity gain amplifying circuit 86. The output of the pass wave of the rectifying circuit 90 which is used for automatic gain control is of course, an analog voltage wave which is the envelope of the electric wave generated by the geophone 64' and this output is available at terminals 94. A comparator circuit 96 is connected to the full wave rectifying circuit 90 for developing a digital output voltage against a variable threshold voltage applied at terminal 98 at which a d.c. voltage is applied from a manual control at the CRT display console. Plus a digital output is delivered between a terminal 100 and ground.

A control voltage of 0–6 volts direct current is applied to the terminal 98 so that the operator may compensate for environmental changes such as rain, snow, temperature and wind which affect the sensitivity of all of the geophones. Stable environmental conditions that affected individual sensors are compensated on a first order basis by changing the gain resistor in the input to the filter stage 82. More complex compensation is usually relegated to the computer program.

Figure 7:
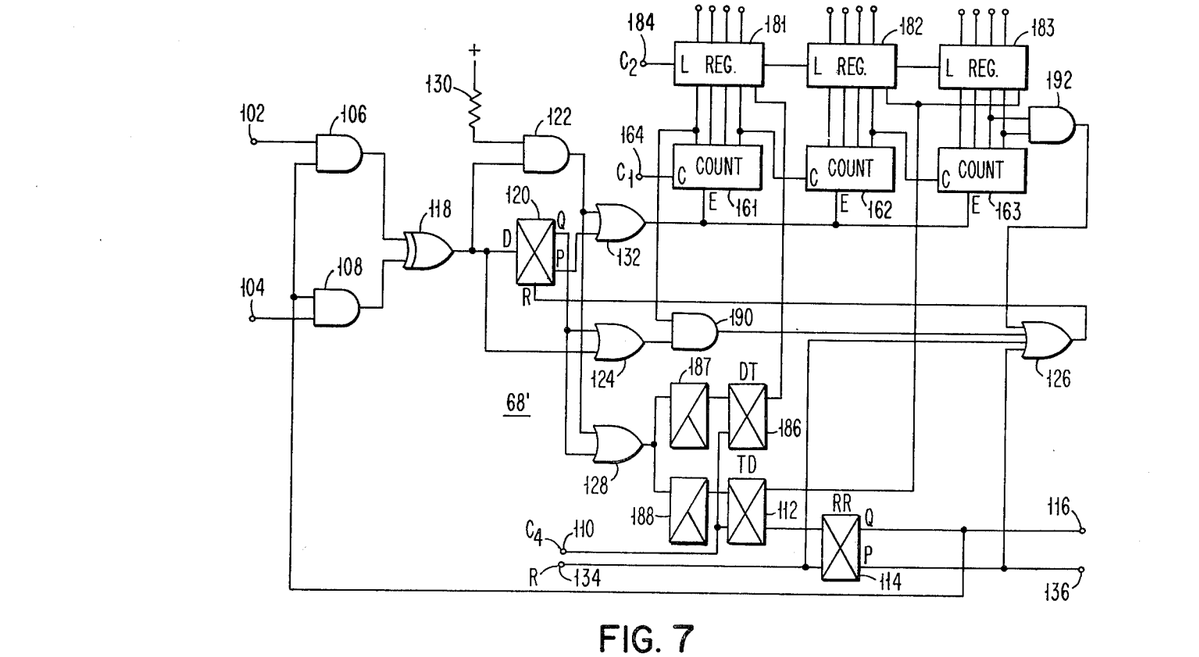
FIG. 7 is a logical diagram of range analyzing circuitry according to the invention.

Range analyzing circuitry according to the invention is shown in the functional diagram of FIG. 7. One pair of geophones for sensing primary and secondary seismic waves respectively at a given point are connected individually to the input terminals 102, 104 connected to a pair of AND gating circuits 106 and 108. A clocking pulse from a system source is applied at terminal 110 to the reset terminal of a bilateral flip-flop circuit 112 which in turn is connected to another bilateral flip-flop circuit 114. The latter is arranged to set the flip-flop circuit 114 and bring up a positive "read request" signal at a terminal 116 for applying to the control logical circuitry and at the same time delivers a unidirectional potential level for arming the AND gating circuits 106 and 108. The AND gating circuits 106 and 108 are connected to the input leads of an exclusive OR (XOR) gating circuit 118. The output of the XOR gating circuit 118 is applied to a set terminal of a bistable, binary flip-flop circuit 120, to an AND gating circuit 122 and to an OR gating circuit 124. A negative read request or reset level from the flip-flop circuit 114 is also applied through an OR gating circuit 126 to the reset or C terminal of the flip-flop circuit 120. The complementary P output terminal of the flip-flop circuit 120 is connected to the OR gating circuit 124 and to another OR gating circuit 128. A positive logical level is applied through a resistor 130 to the AND gating circuit 122 so that it will produce an output only when the output of the XOR gating circuit 118 rises to that logical level and the output is then delivered to the OR gating circuit 128 and to another OR gating circuit 132. The latter circuit has another input connected to the Q output terminal of the bistable, binary flip-flop circuit 120. A reset pulse applied at a terminal 134 is also applied to the OR gating circuit 126 and from this OR gating circuit to the reset or R input terminal of the flip-flop circuit 120. The components thus far described are in the quiescent reset condition at this time which is designated $T_0$ on the timing diagram described below.

Figure 8:
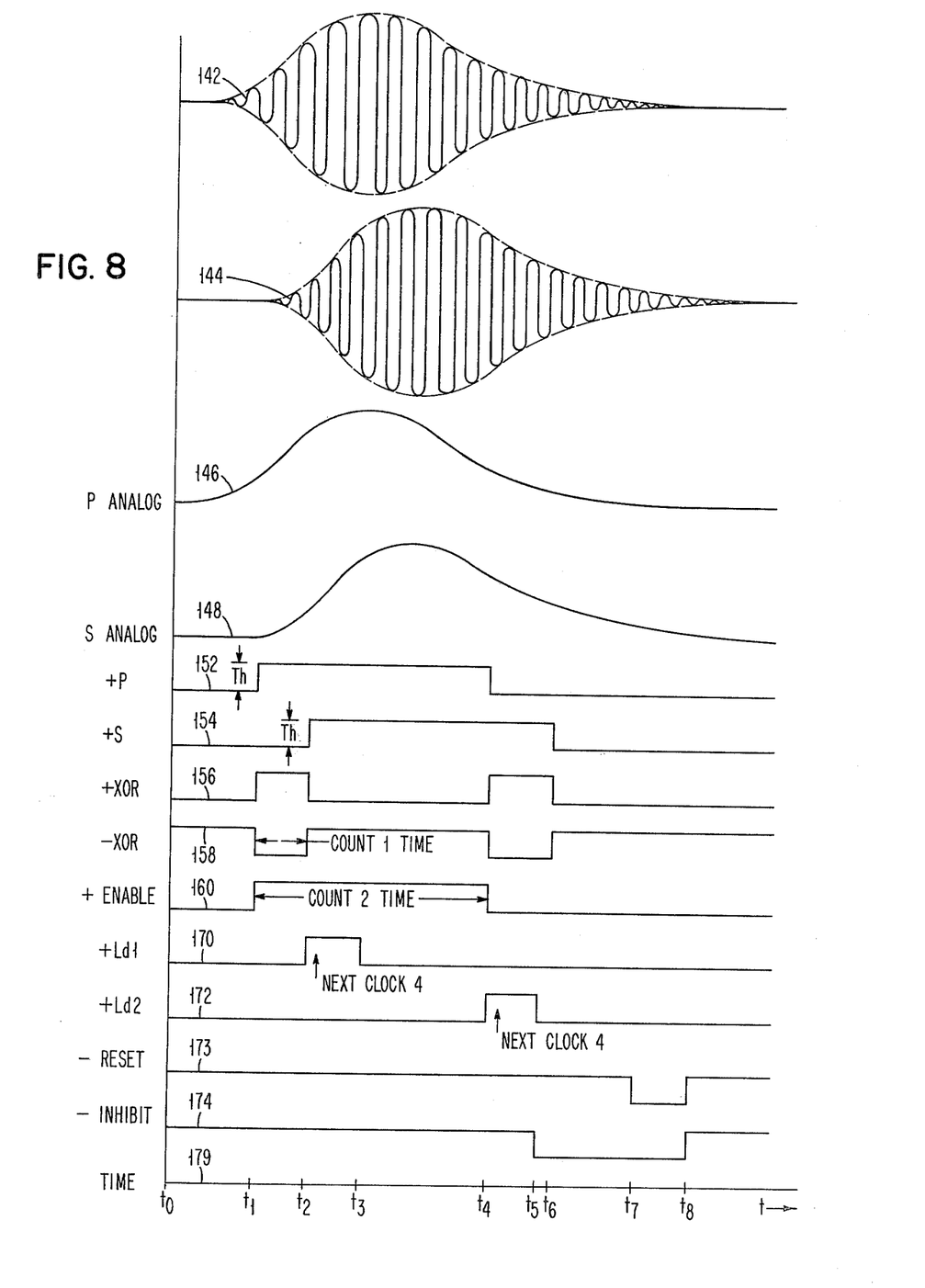
FIG. 8 is a graphical representation of waveforms constituting a timing diagram for the detection system according to the invention.

FIG. 8 is a graphical representation of idealized waveforms developed from the circuitry shown in FIGS. 5, 6, and 7. At some time between time $t_0$ and $t_1$ an impact on the earth generates a related pair of primary and secondary seismic waves as represented by curves 142 and 144 to be propagated. At the output of the detector circuit 90, the envelopes of the curves 142 and 144 are developed into the analog waves represented by the curves 146 and 148. The comparator circuit 96 is a saturated amplifier circuit biased by a threshold voltage applied to the terminals 98 which produces a square wave at the output terminals 100 represented by the curves 152 and 154. These waves are applied to the terminals 102 and 104 of the range analyzing circuit. The output of the XOR gating circuit is represented by a curve 156 and the inverse is represented by a curve 158. The output of the OR gating circuit 132 for enabling the counting circuits is represented by a curve 160.

At some time between $t_0$ and $t_1$ an impact occurring on the perimeter generates a P/S wave pair. At $t_1$ time the P-analog signal represented by curve 146 has sufficient magnitude to match the detector compare threshold voltage and the P-digital line is raised. It remains up until $t_4$ time when the analog signal falls back below the compare voltage threshold level. At $t_2$ time the S analog signal has sufficient magnitude to match the compare voltage threshold level and the S digital line is raised. S digital remains up until $t_6$ time when the analog signal falls back below the compare threshold level. P digital and S digital are used as inputs to the range analyzer. They are directed through an inhibit gate to the XOR circuit 118. The plus exclusive OR (+XOR) line up whenever P and S are different, thus it rises with +P, falls with the arrival of +S, rises again with the fall of +P, and goes down with the fall of +S. The +XOR signal sets the flip-flop circuit 120. The output of the flip-flop circuit 120 by way of OR gating circuit 132, enables three counters 161, 162, 163. These are 4-bit counters connected in series and thus effectively constitute a single 12-bit binary counter. The counters are driven by first clock pulse 1 train applied at terminals 164. This clock 1 pulse train comprises a $\mu s$ pulse that comes at 400 $\mu s$ intervals. Counting is continuous during the time $t_{10}$–$t_4$ denoted "enable", curve 160, on the timing diagram. The flip-flop circuit 120 and XOR gating circuit 118 serves to hold the enable line up.

The counters are connected directly to registers 181, 182 and 183 and thus the registers always contain the binary equivalent of the time elapsed since the arrival of the P-wave. The registers 181 . . . 183 are connected for parallel-in/parallel-out operation. They are loaded by the fall of the first clock 2 pulse that is applied at terminals 184 after the counters 161 . . . 164 are enabled. Clock 2 is a delayed clock 1. It is desired to load the first register 181 with the differential time between the arrival of the P and S waves and the other two registers 182, 183 with the time of the total duration of the P wave. Enabling of the registers is accomplished by latches 186 and 112 turned on by monostable flip-flop circuits 187, 188 and clock 4 applied at terminals 110. The monostable flip-flop circuit 187 is triggered by the condition that the flip-flop circuit 120 is up and the end of -EO, curve 158. The monostable flip-flop circuit 188 is triggered by the Q output of the flip-flop circuit 120 and the start of the second -EO. Although this example assumes that the sensor connected to terminals 102 is activated first, the circuit works equally well if the other sensor is first activated.

The fall of the duration-time latch flip-flop circuit 112 is used to set the Read Request latch flip-flop circuit 114. Plus Read Request activates the PPI display and causes an interrupt to be sent to the Data Processing System. Minus Read Request is used to derive a binary address that is also sent to the Data Processing System and to inhibit, curve 174, any further P and S inputs until the analyzer has been reset, curve 173. The count data on the register output lines goes directly to the mutliplexer and remains valid until the analyzer has been reset.

Two types of false alarm conditions are automatically screened out by the range analyzer. False alarms occur when the interval between the arrival of the P-wave and S-wave is too long or when the total duration is too long.

False alarms of the first type, when the time interval is too long, have two basic causes: Electrical noise or coupling from an outside source induces a signal on either the P-channel or the S-channel. In that case only one digital signal will arrive at the analyzer and the differential time will be infinite. Another cause is when the source of the disturbance is too far away from the perimeter to be of interest. Examples of this are trains on nearby tracks, trucks and earthquakes. These false alarms are screened out by raising the AND gating circuit 190 on the condition of the EO and the carry of the counter 161 to reset the flip-flop circuit 120. Since there would be 17 counts of 400 $\mu s$ each, this means that if the second wave has not arrived in 6.8 ms the condition is invalid. In terms of distance, this corresponds to between 14 and 42 feet away from the perimeter, depending on the propagation velocity in that particular terrain. This timing is adjustable by the setting of the master clock. The above figures are based on a 400 $\mu s$ clock, but the clock pulse interval can be set to any desired value between 200 $\mu s$ and 1 ms.

False alarms, when the total duration of the waves are too long, are caused by large impacts, for example explosions, trucks hitting a loading dock, or large objects being dropped nearby. When the last counter overruns (2-½ seconds on a 400 $\mu s$ clock setting, the time duration monostable flip-flop circuit is inhibited and the flip-flop circuit 120 is reset through the operation of an AND gating circuit 192 by way of the OR gating circuit 126.

Although there are eight data output lines available from the second and third registers as shown, only four need be connected to the multiplexer. Which four are selected is arbitrary and depends on the duration time increments that it is desirable to consider in pattern recognition and like programming at a particular location.

For reasons which will become apparent as the specification now progresses, one geophone, whether connected to the terminals 102 or 104, will be referred to as the "prior" (p) geophone and the other geophone of the pair, whether connected to terminals 104 or 102 will be referred to as the second (S) geophone.

Upon an impact occuring on a line perpendicular to the perimeter originating at a geophone pair, the P-geophone sees only a pure primary or P-wave and the S-geophone sees only a pure secondary or S-wave. For impacts on any other ray some portion of the P-wave will also appear on the S-geophone. These wave components vary as the sine of the angle. At 90°, the full P-wave is on the P-geophone and the full S-wave is on the S-geophone. At 67.5° (at the same distance), the magnitude of the P-component on the P-geophone drops to approximately 90% and a P-component equal to approximately 38% of the full P-wave magnitude appears on the S-geophone at the same time. Similarly, an S-component of about 38% appears on the P-geophone at the same time as the S-wave, decreased 10% in magnitude, appears on the S-geophone. At 45°, both geophones see both waves decreased in magnitude to approximately 70% of the peak value (the value at 90°). Thus, the circuitry according to the invention is fully operative for P- and S- waves arriving from any direction.

Figure 9:
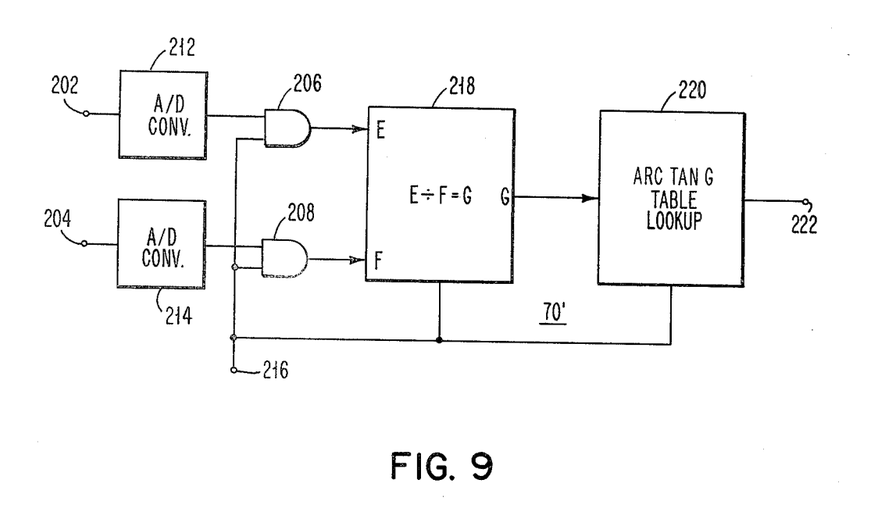
FIG. 9 is a logical diagram of bearing analyzing circuitry according to the invention.

The function of the bearing analyzer circuitry 70 is to provide digital information to the multiplexer from which the angle of the impact, relative to a single geophone pair, can be determined. This is accomplished by two A-D converter and register circuits like the one shown in FIGS. 5, 6 and 7. Essentially the bearing analyzer comprises conventional circuit components connected as shown in FIG. 9. The analog P- and S- waves, as shown by curves 146, 148 are applied to terminals 202 and 204. AND gating circuits 206 and 208 function as in the range analyzer circuitry. The analog-to-digital converting circuitry is represented by the functional blocks 212 and 214 and those skilled in the art will adapt the pertinent circuitry of the range analyzer. When gated by a pulse from the Read Request flip-flop circuit 114 at terminal 116 applied to terminal 216 of the bearing analyzer, the digital data is translated to a conventional arithmetic dividing circuit 218, preferably a part of the programmed data processing system. The output from the dividing circuit 218 is then converted to the bearing (angle) preferably in the data processing system in a "table lookup" process circuit 220 and the bearing data delivered at output terminals 222 connected to the multiplexer circuit. One definite advantage of table lookup for this application is the ability to resolve data at certain bearing angles (for examples between 0 and 5°) to provide the same efficacy in intruder location as for other bearing angles (for example between 70° and 90°).

As previously discussed, the magnitude of the P-wave component on the S-channel and the magnitude of the S-wave component on the P-channel vary according to the sine of the angle from one of the axes formed by the orthogonal geophone pair. If the line of the perimeter (direction of the S-geophone) is considered 0°, then the line perpendicular to the perimeter (direction of the P-geophone) is 90°. The S-wave component peak magnitude varies as the sine of the angle measured from 0° or the cosine of the angle measured from 90°. The magnitude of the P-wave component varies as the sine of the angle measured from 90°; therefore the ratio of the magnitudes when the P-wave is maximum gives the tangent of the angle measured from 90°.

Analog signals from the detector circuits are converted to 3-bit digital equivalents in the A-D converter to provide a possible eight values of angle discrimination per quandrant. This is sufficient information to determine the bearing to within 11°. More precise bearings are readily obtainable merely by increasing the size of the A-D converter and the processing circuitry. The digital register is loaded at the peak of the first analog signal to arrive. The arrangement determines which wave arrived first by comparing the values of the peak magnitudes.

Figure 10:
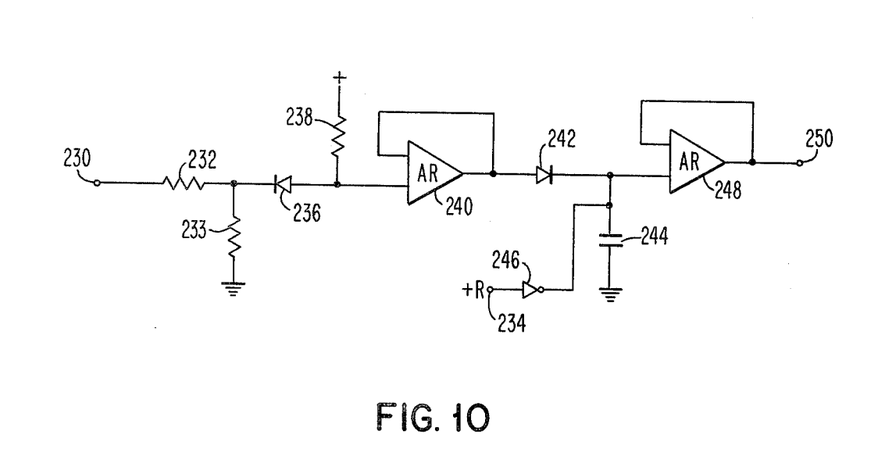
FIG. 10 is a functional diagram of a peak detector according to the invention.

A peak detector circuit according to the invention for the purpose is shown functionally in FIG. 10. An analog wave, curve 142 or 144 but preferably the envelope, curve 146 or 148, is applied to input terminals 230. A voltage divider comprising resistors 232 and 233 is designed for the application at hand to apply the wave to a rectifying diode 236. A level setting potential is applied through a limiting resistor 238 for inputting the resultant wave to an AR amplifier circuit 240. The output of the latter is applied through another diode 242 to a peak signal storage capacitor 244. The latter is reset to zero or a predetermined charge by applying a reset pulse at a terminal 234 (as from terminal 134 of the range analyzer) through an inverting circuit 246. The charge on the capacitor is applied to another AR amplifier circuit 248 and the output, which is a measure of the integrated area under the envelope or curve 146 or 148, is delivered at output terminals 250.

Much unwanted data caused by such things as wind, rain, and Rayleigh surface waves, which would also be detected, are eliminated by choosing the optimum natural frequency for the geophones. For the instantly described system, geophones with 100 Hz frequency were chosen. The geophone output is passed through a filter to attenuate signals above 110 Hz and below 90 Hz, giving a response band centered about 100 Hz, which is the area of least ambient noise. The peak detector circuit shown is used in the determination of the type of intruder by pattern recognition process. The area under the curve as delivered at the output terminals 250 has been found to represent the mass or weight of the intruder. Thus, a man can be predicted as distinguished from a horse and so on. The peak signal magnitude detected by the geophone sensors used in one system ranged from 100 mV for a footstep at 0 M to about 100 uV for a footstep at 6 M (20 ft). Duration ranged from 10 ms to 500 ms. Measurements were made at a distance on the order of 300 meters (about 1000 feet) from the sensors.

Returning to FIG. 1, there is shown a boundary line comprising a plurality of sensors or geophone pairs 21, 22, 23, 24 forming a part of a perimeter boundary about the building 10. This simple arrangement is quite adequate for guarding against an intruder on one side of the line crossing over to the other side and the converse. The triangulation in broken lines clearly shows the ambiguity of location of the intruder. So long as it is desired to learn of an intruder whether entering or within the guarded zone, this arrangement is sufficient. In many instances, however, it is desirable at times to ignore those within the zone, or during business hours for example. In such case, the geophones pairs are "staggered" or laid in two rows as shown for geophone pairs 321, 322, 323 and 324. With this simple alteration, data from three geophone pairs will resolve the otherwise ambiguity without fail.

Another feature of this perimeter system is that a protected zone of arbitrary width can be established easily and used to prevent false alarms originating outside the zone. An impact such as a footstep at either a point inside the zone bounded by the lines 326, 328 or a point outside the zone will generate seismic waves that are detected by the geophone pairs; however, the P-S wave time difference caused by an impact at the inside point is necessarily shorter than the time difference caused by an impact at the outside point. This is simply because the time difference in arrival times is proportional to the linear distance from the source to the sensors. Zoning is implemented by selecting an arbitrary time, corresponding to the desired width of the zone, such that time differentials less than that are accepted as valid and greater time differentials are ignored.

While the invention has been shown and described particularly with reference to a preferred embodiment thereof, and variations have been suggested, it should be clearly understood that those skilled in the art will make changes without departing from the spirit and the scope of the invention as defined in the appended claims.

The invention claimed is:

1. An intruder detecting security system for determining an intrusion across a boundary, comprising
   a plurality of pairs of sensors responsive to waves propagated through geological and like substantially rigid materials with each pair having the sensors arranged operationally orthogonally of each other, and the pairs arranged substantially in line along said boundary,
   analyzing circuitry connected to said sensors for determining the difference in the time for longitudinal and transverse waves set up by a single disturbance to travel from the disturbance to said sensors and
   computing circuitry connected to said analyzing circuitry for resolving location of said disturbance.

2. An intruder detecting security system as defined in claim 1 and wherein
   said pairs of sensors are arranged on either side of said line along said boundary with alternate pairs on the same side
   for resolving ambiguity of direction of said disturbance with respect to said boundary.

3. An intruder detecting security system as defined in claim 1 and wherein
   said sensors are geophones.

4. An intruder detecting security system as defined in claim 3 and wherein:
   said analyzing circuitry comprises band-pass signal amplifying circuitry connected to each sensor and having
   a pass band centered about the natural frequency of the sensor.

5. An intruder detecting security system as defined in claim 4 and wherein
   said pass bandwidth is of the order of twenty percent of said natural frequency.

6. A perimeter intruder detecting security system as defined in claim 2 and wherein
   said analyzing circuitry comprises ranging circuitry coupled to at least one of said sensor pairs, and
   bearing analyzing circuitry coupled to said one sensor pair.

7. A perimeter intruder detecting security system as defined in claim 2 and wherein
   said analyzing circuitry comprises ranging circuitry coupled to at least two of said sensor pairs, and
   said computing circuitry is arranged for determining the location of said disturbance by an arithmetic triangulation process.

8. A perimeter intruder detecting security system as defined in claim 7 and wherein
   said analyzing circuitry further comprises coupling circuitry arranged for coupling to at least three non-colinear pairs of said sensor pairs, and
   said computing circuitry is arranged for resolving any ambiguity in direction by comparing results of said triangulation process.

9. A perimeter intruder detecting security system as defined in claim 2 and wherein
   said computing circuitry is arranged for ignoring all data outside a predetermined zone.

10. A perimeter intruder detecting security system for determining an intrusion into the area within the perimeter, comprising,
  a multiple of pairs of sensors responsive to waves propagated through geological and substantially rigid materials with each pair having the sensors arranged operationally orthogonally of each other, and the pairs oriented substantially along radial and tangential lines with respect to a central location within said area,
  analyzing circuitry connected to said sensors for determining the difference in the times for a single disturbance about said perimeter to travel by shear and by compression waves set up by that single disturbance, and
  computing circuitry connected to said analyzing circuitry for resolving the location of said disturbance by triangulation.

11. A perimeter intruder detecting security system as defined in claim 10 and incorporating
  further analyzing circuitry connected to said sensors for determining the mass of impact of a single disturbance.

12. A perimeter intruder detecting security system as defined in claim 11 and wherein said further analyzing circuitry comprises
  peak detecting circuitry.

13. An intruder detecting system for determining an intrusion across a boundary, comprising
  a plurality of pairs of geophones with each pair having the geophones arranged operationally orthogonally of each other and the pairs located substantially along said boundary,
  a plurality of pairs of detector circuits individually coupled to said pairs of geophones and arranged to produce bistatic output signal levels individually in response to activity of the associated geophones,
  analyzing circuitry coupled to said pairs of detector circuits for determining data from the different times for pressure and shear waves generated by a single impact to travel from the point of said single impact to said geophones, and
  computing circuitry coupled to said analyzing circuitry for resolving said data selectively for presentation and utilization and both.

14. An intruder detecting system for determining an intrusion across a boundary as described in claim 13 and incorporating
  a band-pass filter circuit interposed between a geophone and the associated detector.

15. An intruder detecting system for determining an intrusion across a boundary as described in claim 14 and wherein
  said band-pass filter circuit has a band-width of twenty percent of the center frequency, and
  said center frequency substantially matches the resonant frequency of the associated geophone.

16. An intruder detecting system for determining an intrusion across a boundary as described in claim 14 and incorporating
  an electronically variable impedance device shunted across the output terminals of said band-pass filter and having a control terminal, and
  an automatic gain controlling circuit connected between said control terminal and the associated detector circuit in the polarity for maintaining the gain of the circuit substantially constant.

17. An intruder detecting system for determining an intrusion across a boundary as described in claim 14 and wherein
  said detector circuit comprises
  a full wave rectifying circuit and a comparator coupled to said band-pass filter circuits, and
  a comparator circuit having one input terminals connected to said full-wave rectifying circuit, another input terminals connected to a source of direct potential, and an output terminal,
  said comparator circuit being arranged for producing said bistable output signal levels in accordance with the output of said rectifying circuit being respectively less than said direct potential and equal to and greater than said direct potential.

18. An intruder detecting system for determining an intrusion across a boundary as described in claim 13 and wherein
  said analyzing circuitry comprises gating circuitry coupled to said individual detector circuits and to a source of timing pulses and having output terminals,
  exclusive OR gating circuitry connected to the output terminals of said signal gating circuitry and having an output terminal,
  a binary flip-flop circuit having an input terminal connected to the output terminal of said XOR gating circuitry, a reset terminal, and two complementary output terminals,
  counting circuitry having a count terminal coupled to said source of timing pulses, enabling terminals coupled to one of said output terminals of said flip-flop circuit, and output terminals at which values representing time intervals are presented.

19. An intruder detecting system for determining an intrusion across a boundary as described in claim 18 and incorporating
  an OR gating circuit interposed between said flip-flop circuit and said enabling terminals and having input and output terminals so connected and an additional input terminal,
  an AND gating circuit having one input terminal connected to the output terminal of said XOR gating circuit, another input terminal connected to a potential representing a logical level, and an output terminal connected to said additional terminal of said OR gating circuit,
  register circuitry having input terminals connected to the output terminals of said counting circuitry, loading terminals, connected to said source of timing pulse, at least two enabling terminals, and output terminals at which values representing time intervals are presented, and
  gating circuitry connected between the other of said output terminals of said flip-flop circuit and one of said enabling terminals of said register circuitry for entering a value in a portion of said register circuitry for entering a value in a portion of said register cicuitry representative of the time between the arrival of the pressure and shear waves from one geophone pair.

20. An intruder detecting system for determining an intrusion across a boundary as described in claim 18 and incorporating
  AND gating circuitry having a plurality of input terminals connected to predetermined output terminals of said counting circuitry and having an output terminal coupled to said reset terminal of said flip-flop circuit.

* * * * *